MAGNETIC LOGIC CIRCUITS

Filed Dec. 29, 1966 Sheet 1 of 3

INVENTORS J. T. KOO
W. J. TABOR
L. J. VARNERIN, JR.

BY Herbert M. Shapiro
ATTORNEY

United States Patent Office 3,454,938

Patented July 8, 1969

3,454,938
MAGNETIC LOGIC CIRCUITS

James T. Koo, Allentown, Pa., and William J. Tabor, Murray Hill, and Lawrence J. Varnerin, Jr., Watchung, N.J., assignors to Bell Telephone Laboratories, Incorporated, Murray Hill, and Berkeley Heights, N.J., a corporation of New York Filed Dec. 29, 1966, Ser. No. 605,763
Int. Cl. G11b 5/66; H01f 5/00
U.S. Cl. 340—174 17 Claims This invention relates to magnetic logic circuits and has for a primary object thereof magnetic logic circuitry which operates at relatively high speeds and enables all-magnetic logic and memory circuits.

Figure 1:
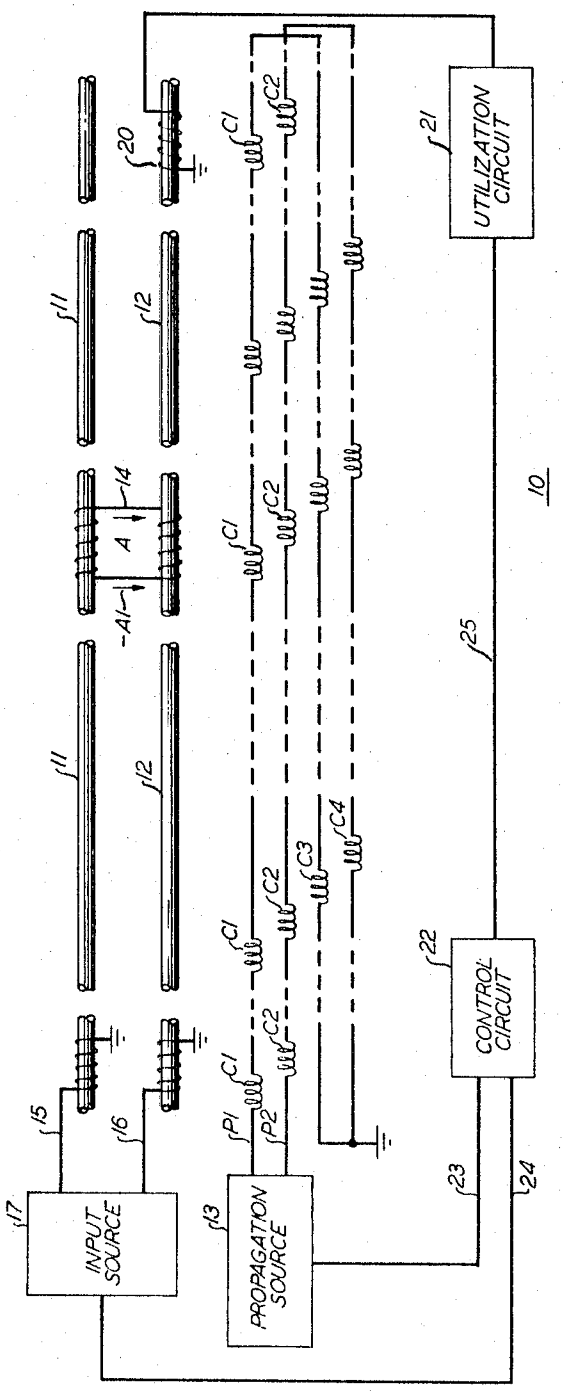

The invention turns to account domain wall shift register devices. K. D. Broadbent, Patent 2,919,432, issued Dec. 29, 1959, discloses such a domain wall shift register device. The device comprises a magnetic medium normally "initialized" to a first direction of magnetization. The magnetization of a portion of the medium is reversed to a second direction in response to a first field in excess of a first (nucleation) threshold generating a reverse magnetized domain which defines leading and trailing walls with adjacent initialized portions of the medium. After a reverse domain is nucleated, second (propagation) fields are generated in consecutive portions of the medium to advance the domain without nucleating additional domains. The second fields are limited to values in excess of a second (propagation) threshold and less than the nucleation threshold.

Fields of like polarity cause leading and trailing domain walls to move in opposite directions in the magnetic medium. So, for a field of a first polarity, the reverse domain grows. For a field of a second polarity, the domain collapses. To move a reverse domain of stable geometry in a first direction in a magnetic medium, a four-phase propagation sequence is employed as disclosed in the aforementioned patent.

A four-phase propagation sequence is provided by coupling to the magnetic medium coils which generate, when pulsed, a field of a first polarity to advance a leading wall and, concurrently, a spatially spaced apart field of a second polarity to advance a trailing wall. Such fields are provided in consecutive portions of the medium to advance reverse domains from input to output positions in the medium. Adjacent reverse domains in a medium are spaced apart the distance a domain travels during a four-phase sequence. A reverse domain, however, typically occupies the space traversed in one-half of the four-phase sequence. The space between adjacent domains is termed a buffer zone.

Another object of this invention, then, is to provide magnetic logic circuitry for performing logic functions responsive to the presence and absence of reverse domains in associated positions in two or more propagation media.

The foregoing and further objects of this invention are realized in one embodiment thereof wherein associated positions in adjacent magnetic wires are coupled, in opposing senses, by a conducting closed loop. A reverse domain is selectively nucleated in and propagated along each wire synchronously. The movement of a reverse domain in one wire past the conducting loop, however, depends on the simultaneous passage of a domain in the associated position in the other wire. If a domain is absent in either wire, the eddy currents associated with the single moving domain generate a field which opposes the advance of that domain. The domain is slowed down and annihilated by next consecutive propagation pulses. An AND circuit is provided.

In another embodiment of this invention a conducting closed loop couples associated positions in two adjacent wires in like senses. The field generated in the conducting loop is insufficient to inhibit the advance of a single domain. The presence of a domain in each wire, on the other hand, generates fields which do inhibit the passage of both. An exclusive-OR circuit is provided.

Accordingly, a feature of this invention is a magnetic logic circuit including a conducting closed loop coupled to first and second associated positions in first and second magnetic media, respectively, responsive to the advance of a domain past the first of the associated positions for controlling the synchronous advance of a domain past the second of the associated positions.

In still another embodiment, the propagation fields are not applied in consecutive portions of first and second media. Rather, an even-numbered propagation coupling, for example, is spaced apart from the next consecutive odd-numbered coupling in a manner to prevent domain walls from propagating in either medium past the uncoupled portions (gap) along the media in response to a normal propagation sequence. A conducting loop again couples associated positions in adjacent media. Those associated positions, however, are chosen to correspond to the gaps, that is, the positions uncoupled by the propagation couplings. The conducting loop thus bridges the gaps left by the propagation couplings and additional means are provided for advancing a domain past the gap in the first medium. A domain being advanced past the gap in the first medium, then, generates an appropriate field advancing a domain in the second medium past the gap there. If only the first medium includes a domain, the field generated can, of course, advance no domain in the second medium because that domain is absent. If the first medium includes no domain, no field is generated for advancing the domain past the gap in the second. Various logic circuits are provided.

The magnetic media employed are, conveniently, wires of compensated molypermalloy as disclosed in copending application Ser. No. 458,140, filed May 24, 1965, now Patent Number 3,365,290 for D. H. Smith and E. M. Tolman.

Accordingly, another feature of this invention is a magnetic logic circuit comprising first and second magnetic wires and including propagation coils coupled to the wires except at a prescribed portion in each. A conducting closed loop is coupled to the uncoupled portions along the wires for providing a field for controlling the advance of domains past the gap along the second wire in response to the simultaneous movement of a domain past the gap in the first.

Figure 5:
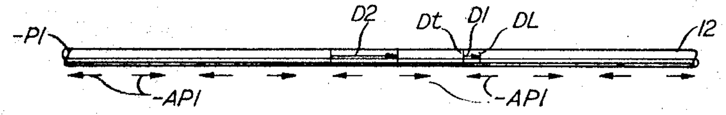
Figure 6:
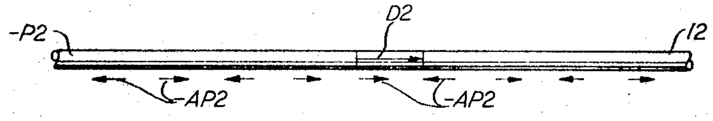
Figure 7:
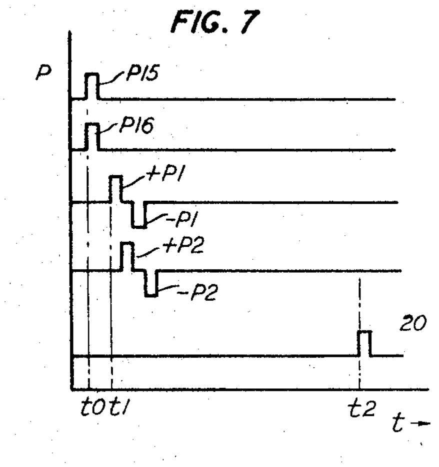
Figure 8:
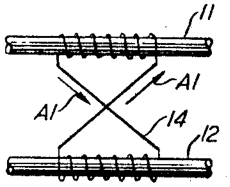

The foregoing and further objects and features of this inventiton will be understood more fully from a consideration of the following detailed description rendered in conjunction with the accompanying drawing, in which:

FIGS. 1 and 8 throught 12 are schematic representations of magnetic wire logic circuits in accordance with this invention;

FIGS. 2 through 6 are schematic representations of portions of a magnetic wire useful in the logic circuits of FIGS. 1 and 8 through 12 showing magnetic conditions therein during operation; and FIG. 7 is a pulse diagram of the operation of the logic circuit of FIG. 1.

The invention and underlying phenomena are described primarily in terms of an AND circuit 10 shown in FIG. 1. Other embodiments thereof are described thereafter, essentially, in terms of modifications of that AND circuit in deference to brevity. It is to be understood that the proposed explanation of the underlying phenomena for the AND circuit of FIG. 1 is applicable to the other embodiments.

Attention is invited to FIG. 1. The AND circuit 10 shown there includes first and second domain wall wires 11 and 12. Propagation conductors P1 and P2 couple each of wires 11 and 12 in an interleaved fashion as indicated by the coils C1, C2, C3, C4, . . . shown in FIG. 1 below the representation of wire 12. The propagation coils couple wires 11 and 12 illustratively such that a pulse of positive polarity applied to conductor P1 and then to conductor P2 followed by a pulse of negative polarity applied to conductor P1 and then to conductor P2 advance a reverse domain one position. The propagation conductors are connected between a propagation source 13 and ground.

Figure 2:
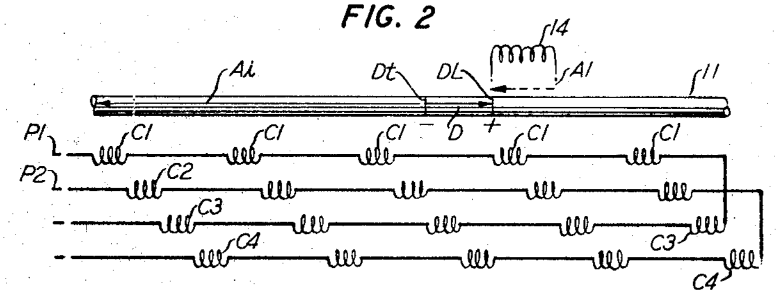

A portion of wire 11 is shown in FIG. 2. A reverse domain D is shown in that portion of wire 11 as an arrow directed to the right and bounded by vertical lines DL and D*t* which represent the leading and trailing walls of domain D, respectively. The magnetic wire 11 (as are all magnetic wires herein) is assumed initialized to a magnetization condition represented by an arrow A*i* directed to the left as view in FIG. 2.

A reverse domain occupies a length of wire also coupled by a P1 coil and an adjacent P2 coil. Adjacent reverse domains occupy positions spaced apart by a buffer zone which is, illustratively, as long as a reverse domain. Associated positions for reverse domains in two wires such as wires 11 and 12 in FIG. 1 are defined illustratively then as a pair of positions in the magnetic wires which are also coupled by the associated P1 and P2 coils. A conducting loop 14 couples, in first and second senses, such a pair of associated positions along wires 11 and 12, respectively.

Nucleation conductors 15 and 16 couple input portions of wires 11 and 12 also coupled by coils C1 and C2 of conductors P1 and P2, respectively, as shown in FIG. 1. Conductors 15 and 16 are connected between an input source 17 and ground.

A sense conductor 20 couples an output position along wire 12 also coupled by coils C1 and C2. Conductor 20 is connected between a utilization circuit 21 and ground.

Sources 13 and 17 and utilization circuit 21 are connected to a control circuit 22 via conductors 23, 24 and 25. The various sources and circuits may be any such elements capable of operating in acordance with this invention.

FIGS. 3, 4, 5, and 6 show domain wall wire 12 of FIG. 1 including two representative domains D1 and D2 being advanced synchronously toward conducting loop 14.

Figure 3:
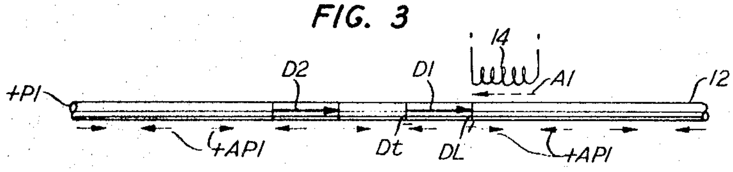

Beneath the representation of wire 12 in each of FIGS. 3, 4, 5, and 6 is shown an arrangement of arrows. Such arrows represent the configuration of fields generated by the pulse sequence on propagation conductors P1 and P2 for so advancing those domains. The arrows, in each instance, are designated to correspond to the pulse applied to generate the corresponding field. Thus the arrows in FIG. 3 are designated +AP1 to correspond to the pulse +P1 indicated to the left of wire 12 as viewed in FIG. 3. It is to be appreciated that the field generated corresponds in polarity and position to the coils of the corresponding propagation conductors. Of course, such a field and the means providing it are well understood. They are indicated here only as a context for the explanation of the operation of a conducting closed loop 14 on advancing domains for providing logic operations in accordance with this invention.

The conducting loop 14 of FIG. 1 operates to pass domain D1 in wire 12 only when a domain is being advanced past loop 14 simultaneously in wire 11. We will adopt the convention that each domain, such as D1 in wire 12, is positive at the wall DL and negative at the wall D*t* as indicated in FIG. 3. As a domain advances along wire 12, it induces in loop 14 a current indicated by arrow A in FIG. 1 generating a field directed to the left in wire 12. Such a field is represented by broken arrow A1 directed to the left in FIG. 3 and may be seen to oppose the advance of a reverse domain D1 there.

Consider the case when a domain D1 being advanced to the right along wire 12 reaches the conducting loop 14 at the same time a domain D, being similarly advanced in wire 11, reaches that loop. As was stated above, domain D1 alone causes a current represented by arrow A (FIG. 1) to be induced in loop 14. When a domain D reaches loop 14 it alone also induces a current represented by the arrow designated —A1 in FIG. 1. When both domains reach the conducting loop simultaneously, the currents induced in the loop cancel, because of the opposing coupling senses, and each domain is advanced by propagation pulses in conventional domain wall shift register motion as if the loop were not present. The simultaneous arrival of domains D and D1 at loop 14 is shown in FIGS. 2 and 3.

Now consider the case where domain D1 arrives at coil 14 when domain D is not present. A field is generated by the current induced in coil 14 by the moving domain as described before. That field is represented by the broken arrow A1 in FIG. 3. It is seen that field A1 again is opposed to the propagation field, represented by arrow +AP1, at the same location. As is well known, a reduction in the propagation field results in a reduction in the advancement of a domain so long as the advancing field is still in excess of the propagation threshold. Consequently, rather than advancing to point *b* in wire 12 of FIG. 4 as would normally occur, the leading domain wall DL of domain D1 advances only to a point *a* short of point *b*. The trailing domain wall D*t* of domain D*t* is advanced fully in response to the propagation fields as might be expected because it has not yet encountered loop 14. The term "advanced fully" as used here indicates that the wall is advanced to a position where the field generated by a current in the next consecutive coil again advances the wall. The point *a* is short of such a position.

Figure 4:
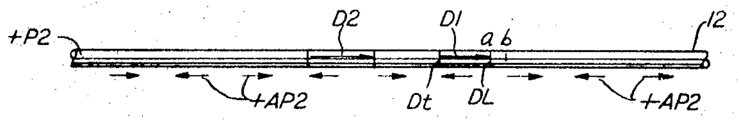

The next consecutive propagation pulse on conductor P2(+P2) generates the field configuration represented by arrows +AP2 in FIG. 4. Such a field advances the trailing domain wall of domain D1 but is not positioned to influence the leading domain wall. The former advances; the latter remains unmoved. Consequently, the domain is further shortened as shown in FIG. 5.

The next propagation pulse —P1 generates the field represented by arrows —AP1 in FIG. 5. The field is in a direction and position to collapse domain D1. FIG. 6 shows domain D1 fully collapsed and domain D2 advanced normally by the propagation fields.

The next propagation pulse —P2 generates the field represented by arrows —AP2 in FIG. 6. That field advances domain D2 to the position of loop 14.

The operation is demonstrated conveniently in the context of the arrangement of FIG. 1. Specifically, input source 17 pulses conductors 15 and 16, under the control of control circuit 22. Such pulses are designated P15 and P16 at time *t0* in the pulse diagram of FIG. 7. Consequently, say domains D and D1 are nucleated in the coupled portions of wires 11 and 12 respectively. At time *t1*, propagation source 13 initiates propagation sequences indicated by the pulses +P1, +P2, —P1 and —P2 in FIG. 7 for generating the fields discussed in connection with FIGS. 3, 4, 5, and 6, respectively. At a latter time *t2* in FIG. 7, an output pulse P20 is provided in conductor 20 for detection via utilization circuit 21 under the control of control circuit 22. Had either of pulses P15 and P16 been absent at time *t0*, pulse P20 would have been absent at time *t2*. Consequently, it has been demonstrated that the circuit of FIG. 1 operates as an AND circuit.

It is clear, then, that a domain being advanced along a single magnetic propagation medium or channel induces in a conducting closed loop thereabout eddy currents which generate a field to oppose the advance of the domain along the channel. In this manner the domain becomes out of synchronism with the propagation pulse sequence and is later annihilated. Domains being advanced along two channels coupled by the conducting closed loop induce in that loop currents which cancel one another when the senses of the couplings between the loop and the two channels are chosen to this end. Consequently, whether or not a domain being propagated along a second channel is in synchronism with the propagation pulse sequence at a conducting loop is controlled by the presence or absence of a domain in a first channel also coupled by that loop. Of course, the senses of the couplings may be chosen otherwise thus affording additional embodiments. For example, the senses of the couplings may be chosen alike such that the eddy currents induced by each advancing domain add to one another. Further, the field generated by those currents may be arranged to inhibit the advance of domains.

FIG. 8 shows the portions of wires 11 and 12 of FIG. 1 with a loop 14 coupled to associated positions in like senses. If domains such as D and D1 are advanced synchronously along wires 11 and 12, each one again induces a current in loop 14. Because of the like senses of the couplings, however, the currents so induced are of like polarity and each domain is stopped as discussed in connection with FIGS. 3, 4, 5, and 6. The circuit is arranged such that the passage of a single domain is insufficient to slow the domain to an extent required for later annihilation. Such operation is insured by proper adjustment of the drive field magnitude, the drive field pulse duration, and the design (i.e., the number of turns and resistance) of loop 14. The circuit functions to provide an output in conductor 20 (or in a like conductor, not shown, coupled to wire 11) except when pulses are present on both of (input) conductors 15 and 16. The embodiment of FIG. 8, in addition, provides an inversion function. For example, if a control sequence of domains is provided in wire 12, by say consecutive input pulses on conductor 16, the presence of a domain (a binary one) at an associated position in wire 11 causes the corresponding domain in wire 12 to be annihilated providing a zero. The absence of a domain (a zero) in wire 11 allows the corresponding domain on wire 12 to pass providing a one.

Figure 9:
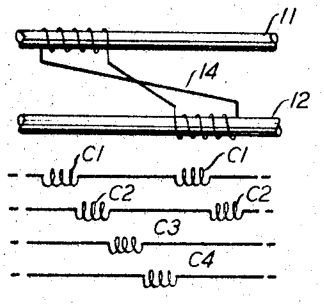
Figure 10:
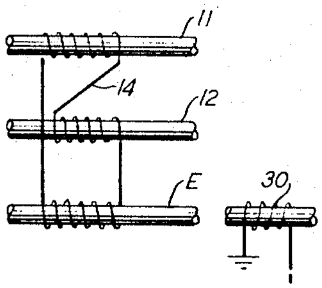

FIG. 9 shows portions of wires 11 and 12 of FIG. 1 where conducting loop 14 of FIG. 1 couples associated positions along wires 11 and 12 offset by one set of propagation coils. For example, loop 14 couples that portion of wire 11 also coupled by C1 and C2 coils as shown in FIG. 10. Loop 14 however, couples wire 12 at a portion coupled by next adjacent C1 and C2 coils. Couplings to the two wires are in like sense. This embodiment constitutes a modification of the embodiment of FIG. 8 operating in exactly the manner described in connection with the latter figure except that the domains in wire 12 are relatively long, for example, the length of six consecutive propagation coils while those in wire 11 are the length of only two.

FIG. 10 shows a combination of the circuits of FIGS. 1 and 8. Specifically, FIG. 8 shows portions of wires 11 and 12 of FIG. 1 including a conducting loop 14 coupled to the two wires in like sense as was described for the FIG. 8 circuit hereinbefore. However, conducting loop 14 also couples an extra wire E in the opposite sense. Wires 12 and E are operated as is the embodiment of the AND circuit of FIG. 1. Wires 11 and 12, however, are operated as is the embodiment of FIG. 8. Input information is provided on wires 11 and 12 as discussed in connection with FIG. 1. In addition, a continuous "control" stream of domains is provided on wire E, by means not shown. A domain in wire 11 or 12 and in wire E provides current cancellation in loop 14 and allows the passage of the corresponding domain in wire E. If domains are provided simultaneously in wires 11 and 12 (as well as in wire E) current cancellation does not occur. Rather the current in loop 14 is of a polarity to advance domains and thus insure passage of the domain in wire E. Thus, the embodiment of FIG. 10 operates as an OR circuit, an output being available in a sense conductor 30 coupled to an output position along wire E. Sense conductor 30 is connected conveniently between say utilization circuit 21 of FIG. 1 and ground. In this arrangement, wires 11 and 12 are terminated without output connections.

Figure 11:
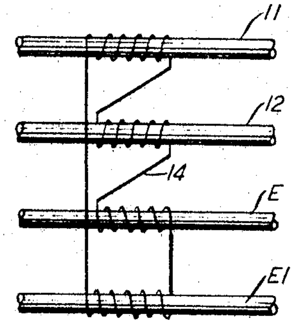

The use of a "multi-coil junction" as shown in FIG. 10 permits programmed switching of reverse domains from a single input wire to any one of $n$ possible output wires. FIG. 10 shows such an operation for transferring information from each of wires 11 and 12 to wire E. FIG. 11 shows an additional magnetic wire E1 coupled by loop 14 as is wire E of FIG. 10. The coupling to wire E, however, is now reversed from that shown in FIG. 10. The coincident arrival at loop 14 of reverse domains on one of wires 11, 12, or E (one at a time) along with a domain (of a series of domains) on wire E1 permits passage of the domain in whichever of wires 11, 12, or E can be programmed to include domains during appropriate time slots to this end.

Remaining embodiments in accordance with this invention incorporate a modification of the basic propagation coil arrangement as shown in FIGS. 1 and 2. Specifically, gaps are included between specified propagation coils. The gaps prevent domain walls from being advanced in response to the propagation pulse sequence provided during normal shift register operation. An additional coil positioned in one of the gaps is energized controllably, via external circuitry, for causing domain propagation past a gap. A conducting loop coupling the gaps in adjacent wires forms an arrangement analogous to loop 14 of FIG. 1. The logic functions discussed hereinbefore are again implemented. Only the AND circuit, analogous to that shown in FIG. 1, is discussed.

Figure 12:
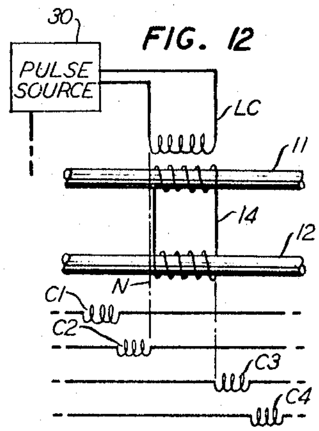

FIG. 12 shows portions of wires 11 and 12 of FIG. 1 coupled by a conducting loop again designated 14 as in FIG. 1. It is to be noted, however, that in the present embodiment, the portions of wires 11 and 12 coupled by loop 14 are uncoupled by propagation coils as indicated by the spacing between coils C2 and C3 as shown in FIG. 12. An additional "logic" conductor LC couples wire 11 at the position also coupled by loop 14.

Normal shift register operation advances domains in wires 11 and 12 to the positions indicated by the broken vertical line designated N in FIG. 12. Thereafter, an external pulse source 30 pulses conductor LC (under the control of a control circuit not shown) in a manner to advance a (leading) domain wall in wire 11 to the position of coil C3. Such advancement of the domain induces a current, as before, in loop 14. The senses between the couplings of loop 14 and wires 11 and 12, however, are such that the current so induced generates a field for advancing a leading domain wall in wire 12 to the position of the coil C3. Normal shift register operation continues. If a domain is present only in wire 12, no such current is induced and the leading domain wall of that domain is stopped, by the absence of an advancing field at the gap, for later annihilation. If a domain is present only in wire 11, no domain is present in wire 12 to be advanced by that current. AND operation is thus demonstrated. Modification of the embodiments of FIGS. 8, 9, 10 and 11 to this end is analogous to the modification of the AND circuit of FIG. 1 as just described. Increased operating margins are permitted by the modification described in connection with FIG. 12 because the logic circuit is separate from the shift register mechanism and therefore the design of the logic circuit can be optimized without considering the performance of the shift register.

In embodiments in accordance with this invention where gaps are included between prescribed next-adjacent propagation coils, the gap between adjacent coils along the "controlled" wire, such as wire 12 of FIG. 12, may be narrower than the gap along the "control" wire 11. A wider gap along the control wire permits a longer duration field at the controlled wire. A narrower gap along the controlled wire permits, inter alia, shorter distances for domain movement. The shorter the distance, the more easily the moving fields are provided. Further, the gap along the controlled wire may be of negligible width or even absent providing an embodiment as shown in FIG. 8 including an additional conductor LC as shown in FIG. 12.

In embodiments wherein gaps are absent along the controlled wire, a domain is advanced normally past the conducting closed loop except when an additional pulse on coil LC (FIG. 12) simultaneously advances a domain in the control wire past the conducting closed loop there. In the last-mentioned situation a field is generated in the controlled wire inhibiting the further movement of the domain there in response to the normal propagation sequence. Actually, the field so generated drives the domain in controlled wire 11 backward (to the left as viewed in FIG. 12) so that the domain is not advanced by the field of the next consecutively pulsed propagation coil. The OR and inversion functions are most easily realized with this implementation.

Although the propagation conductors are described herein as including coils wrapped about wires, it is contemplated that such an arrangement be implemented by strap solenoids. Moreover, such arrangements are not limited to wires. To the contrary, magnetic sheet arrangements of the type described in the aforementioned Broadbent patent and in copending applications Ser. No. 579,995, and Ser. No. 579,931, filed Sept. 16, 1966, for P. C. Michaelis, and for A. H. Bobeck, U. F. Gianola, R. C. Sherwood and W. Shockley, respectively, may be adapted to this end.

Such implementations as described herein supply all the consistent functions necessary for the realization of a general purpose computer and are compatible with domain wall memories of the type described in copending applications Ser. No. 579,902, and Ser. No. 579,904, filed Sept. 16, 1966, for H. E. D. Scovil, and for A. H. Bobeck, respectively.

What has been described is considered only illustrative of the principles of this invention. Accordingly, other and different arrangements according to the principles of this invention may be devised by one skilled in the art without departing from the spirit and scope of this invention.

What is claimed is:

1. A magnetic logic circuit comprising first and second propagation channels each including input and output positions, means for selectively nucleating reverse domains in said input positions, propagation means for advancing reverse domains along said channels in synchronism toward corresponding output positions, means coupled to associated positions in said first and second channels intermediate corresponding input and output positions responsive to the passage of a reverse domain in said first channel for controlling the passage of a reverse domain in the associated position in said second channel, and means coupled to said output position in said second channel for detecting the presence and absence of reverse domains.

2. A circuit in accordance with claim 1 wherein said first and second channels each comprise magnetic wire.

3. A circuit in accordance with claim 2 wherein said means coupled to associated positions comprises a conducting closed loop.

4. A circuit in accordance with claim 3 wherein said conducting closed loop couples said wires at said associated positions in a first sense.

5. A circuit in accordance with claim 3 wherein said conducting closed loop couples said first and second wires at said associated positions in first and second senses, respectively.

6. A circuit in accordance with claim 3 wherein said associated positions are offset from one another.

7. A circuit in accordance with claim 4 including a third magnetic wire wherein said conducting closed loop also couples said third wire at an associated position.

8. A circuit in accordance with claim 7 wherein said conducting closed loop couples said third wire in said second sense.

9. A circuit in accordance with claim 7 including a fourth wire wherein said conducting closed loop couples said fourth wire in said second sense and couples said first, second and third wires in a first sense.

10. A circuit in accordance with claim 2 wherein said propagation means includes an arrangement of propagation couplings generating consecutively offset fields for advancing reverse domains when pulsed in a four-phase sequence.

11. A circuit in accordance with claim 10 wherein prescribed consecutive ones of said propagation couplings are spaced apart to form an uncoupled gap along each of said first and second wires, and wherein said means coupled to associated positions comprises a conducting closed loop coupled to said gaps.

12. A circuit in accordance with claim 11 including means responsive to a signal for generating in said uncoupled gap in said first wire a field of an amplitude and in a direction for advancing reverse domains.

13. A circuit in accordance with claim 12 wherein said conducting closed loop couples said first and second wires in a first sense.

14. A circuit in accordance with claim 12 wherein said conducting closed loop couples said first and second wires in first and second senses respectively.

15. A circuit in accordance with claim 12 wherein said gap along said first wire is wider than said gap along said second wire.

16. A circuit in accordance with claim 15 wherein said gap along said second wire is reduced to a negligible width, said conducting closed loop being coupled to said second wire at said gap in a sense such that the advance of a reverse domain through the gap in said first wire inhibits the advance of said reverse domain in said second wire.

17. In combination, first and second domain wall wires, means for selectively providing reverse magnetized domains in said wires, multiphase means for moving domains incrementally along said wires, and a conducting closed loop coupled to corresponding positions along said wires such that only the synchronized arrival of domains at said corresponding positions enables the passage of domains thereby.

References Cited

UNITED STATES PATENTS

| | | | |
|---|---|---|---|
| 3,316,543 | 4/1967 | Tickle | 340—174 |
| 3,351,922 | 11/1967 | Snyder | 340—174 |

OTHER REFERENCES

Journal of Applied Physics, "Controlled Domain Tip Propagation," part I, by Spain, vol. 37, #7, June 1966, pp. 2572–2583.

Journal of Applied Physics, "Controlled Domain Tip Propagation," part II, by Spain et al., vol. 37, #7, June 1966, pp. 2584–2593.

Electronic Design, "Challenge to Transistors in Logic Circuitry," by Sclater, Aug. 16, 1966, pp. 17 and 18.

STANLEY M. URYNOWICZ, Jr., *Primary Examiner.*